US010480700B2

(12) United States Patent
Graef

(10) Patent No.: US 10,480,700 B2
(45) Date of Patent: Nov. 19, 2019

(54) NOZZLE ARRANGEMENT FOR FLOWABLE SUBSTANCES

(71) Applicant: AGROTOP GMBH, Obertraubling (DE)

(72) Inventor: Steffen Graef, Obertraubling (DE)

(73) Assignee: AGROTOP GMBH (DE)

( * ) Notice: Subject to any disclaimer, the term of this patent is extended or adjusted under 35 U.S.C. 154(b) by 0 days.

(21) Appl. No.: 15/379,171

(22) Filed: Dec. 14, 2016

(65) Prior Publication Data

US 2017/0165699 A1 Jun. 15, 2017

(30) Foreign Application Priority Data

Dec. 14, 2015 (DE) .................. 10 2015 121 762

(51) Int. Cl.
| | |
|---|---|
| *F16L 37/248* | (2006.01) |
| *A01C 23/04* | (2006.01) |
| *A01M 7/00* | (2006.01) |
| *A01G 25/00* | (2006.01) |
| *B05B 1/00* | (2006.01) |
| *B05C 17/005* | (2006.01) |
| *B05B 15/65* | (2018.01) |

(52) U.S. Cl.
CPC .......... *F16L 37/248* (2013.01); *A01C 23/047* (2013.01); *A01G 25/00* (2013.01); *A01M 7/006* (2013.01); *B05B 1/00* (2013.01); *B05B 15/65* (2018.02); *B05C 17/00509* (2013.01)

(58) Field of Classification Search
CPC .......... F16L 37/248; B05B 15/65; B05B 1/16; A01C 23/047; A01G 25/00; A01M 7/006; B05C 17/00509

USPC .................. 239/390, 397, 589, 600
See application file for complete search history.

(56) References Cited

U.S. PATENT DOCUMENTS

| | | | |
|---|---|---|---|
| 28,694 A | 6/1860 | Smith | |
| 3,448,896 A * | 6/1969 | Sakuta | B65D 35/12 222/568 |
| 4,258,884 A * | 3/1981 | Rogers | B05C 17/00516 239/390 |
| 5,104,013 A | 4/1992 | Hawley | 222/566 |
| 7,837,133 B2 | 11/2010 | Zhou | 239/392 |
| 8,210,455 B2 * | 7/2012 | Newbold | B05C 5/02 239/589 |

(Continued)

FOREIGN PATENT DOCUMENTS

DE 1833453 6/1961

OTHER PUBLICATIONS

Extended European Search Report (w/machine translation of relevant portions) issued in application No. 16203175.1, dated May 10, 2017 (8 pgs).

(Continued)

*Primary Examiner* — Steven J Ganey
(74) *Attorney, Agent, or Firm* — Hayes Soloway P.C.

(57) ABSTRACT

A nozzle device for dispensing flowable substances, having a support and a nozzle element arranged at least in part within this support, which element is suitable and intended for dispensing the flowable substance, and having a first coupler, in order to arrange the nozzle device detachably to a supply for the flowable substance. According to the invention, the nozzle device has a second coupler in order to fasten the nozzle device detachably to a further nozzle device.

18 Claims, 2 Drawing Sheets

(56) References Cited

U.S. PATENT DOCUMENTS 8,936,207 B2 * 1/2015 Swan .................... B05B 7/0425
239/600

OTHER PUBLICATIONS

German Office Action (no translation) issued in application No. 10 2015 121 762.7, dated. Sep. 1, 2016 (5 pgs).

* cited by examiner

NOZZLE ARRANGEMENT FOR FLOWABLE SUBSTANCES

BACKGROUND OF THE INVENTION

The present invention relates to a nozzle arrangement. The invention will be described with reference to nozzles which can be used in particular in the field of agriculture. In such case, for example an (in particular liquid) fertiliser, but also possibly pesticides or other substances, can be applied by means of such nozzles. To this end, agricultural machines often have line systems on which such nozzles can be arranged, in order thus to spread the fertiliser.

In this case, it may be necessary for a variety of reasons to change the actual nozzles, for example because the substance to be applied is changed or alternatively because the type of application is to be changed. In the prior art, to this end in each case the nozzles or nozzle heads are removed from a large number of lines and are placed for example in a storage box. This operation is often relatively awkward. On one hand, constituents of the individual nozzles, such as for example sealing rings, may get lost. On the other hand, especially in the event of frequent changing, reattachment of other nozzles is also relatively complex. For this purpose, the user has to grasp the individual nozzles in each case, orient them correctly and attach them to the liquid outlets.

It is therefore the object of the present invention to provide a nozzle arrangement which permits more rapid changing operations. In addition, also in particular during storage, loss of individual components of the respective nozzle arrangements is to be prevented.

SUMMARY OF THE INVENTION

A nozzle device according to the invention for dispensing flowable substances has a support and at least one nozzle element arranged at least in part within this support, which element is suitable and intended for dispensing the flowable substance. Furthermore, the nozzle device has a first coupling means in order to arrange the nozzle device detachably on a supply means for the flowable substance.

According to the invention, the nozzle device has a second coupling means in order to fasten the nozzle device detachably to a further nozzle device, and in particular to a nozzle device of the same type.

It is therefore proposed in the context of the invention that—in particular for storage purposes—a plurality of nozzle devices be able to be fastened to each other by means of the coupling means described. In this case, as soon as a change is necessary, the user can remove individual nozzle devices and connect to further nozzle devices. In this manner, the risk of individual components of the nozzle arrangements or nozzle devices getting lost is minimised. Reattachment of the nozzle devices for example to an agricultural machine can also be facilitated. In this context, it would be possible for in each case a plurality of nozzle devices to be stored plugged together or fastened to each other and to be individually screwed onto and/or placed on corresponding lines of the machine.

The supply means may be for example a line, in particular a pipeline, via which a liquid is dispensed. The nozzle device may be arranged on this line. In such case, preferably an end portion of this supply line is inserted into the nozzle device. Also, projections which engage in recesses in the nozzle device so that the latter can be fastened detachably to the supply line may be arranged on this end portion of the supply line.

Owing to the configuration described according to the invention, a plurality of nozzle devices can also be fastened to each other, so that overall a rod is produced which is composed of a large number of nozzle devices. Also, to fasten these nozzle devices the individual nozzle devices can be twisted off this rod again and be arranged on the individual lines.

In a further advantageous embodiment, the nozzle element is detachable from the support. Preferably the nozzle element can be inserted into at least one region of the support. The flowable substance which is to be applied is in particular a liquid substance, for example a substance which is selected from a group of substances including fertilisers, cleaning agents, pesticides, fungicides and the like. In a further advantageous embodiment, at least one element of the nozzle device, for example the support and/or the nozzle element, is manufactured from a plastics material. More preferably, this at least one element is manufactured from POM. In a further advantageous embodiment, the plastics material is a plastics material which is stable or resistant to media such as fertilisers, fungicides or pesticides.

The present invention furthermore provides a nozzle arrangement which has at least two nozzle devices of the type described above. Advantageously, these two nozzle devices are connected together via the coupling means described. In this case, the nozzle devices of this nozzle arrangement may be connected together by means of the first coupling means of the first nozzle device and the second coupling means of the second nozzle device.

In a further advantageous embodiment, the nozzle element itself is formed in at least two parts. For example, the nozzle element could have a dispensing means which dispenses the flowable substance, and also a further element separable from this dispensing element.

In a further advantageous embodiment, the nozzle element is arranged in a substantially cylindrical portion of the support.

In a further advantageous embodiment, the support has a cylindrical receiving portion. This receiving portion is preferably formed in such a way that the above-mentioned cylindrical portion of the support which serves to receive the nozzle element can be inserted, and in particular introduced or pushed, into this receiving portion.

In a further advantageous embodiment, at least one coupling means has a latch element which is suitable and intended to latch in the other coupling means.

In a further advantageous embodiment, in an assembled state of two nozzle devices, one nozzle device is rotatable through a predetermined angle relative to the other, in particular for the purpose of latching or for cancelling out corresponding latching. Advantageously, in this case this angle is greater than 5°, preferably greater than 10°, preferably greater than 15°. Furthermore, this angle is preferably less than 180°, preferably less than 150°, preferably less than 120°, preferably less than 90°, preferably less than 60° and more preferably less than 45°. Such angular ranges have proved ergonomically beneficial.

Preferably at least the first coupling means is formed on the support. Preferably at least the second coupling means is formed on the support. Preferably both coupling means are formed on the support. In a further advantageous embodiment, the support is formed in one piece.

Advantageously, the support is symmetrical with respect to at least one plane of symmetry. Advantageously, the support is symmetrical with respect to two planes of symmetry. It is also possible for the support to be formed to be rotationally symmetrical, in particular rotationally symmetrical with respect to a 180° rotation.

In a further advantageous embodiment, the second coupling means of the nozzle device cooperates mechanically with a first coupling means of a further nozzle device in order to fasten two nozzle devices detachably to one another.

This means in particular that these two first and second coupling means of two nozzle devices can be connected mechanically together in order to fasten two nozzle devices detachably to one another.

In a further advantageous embodiment, at least one coupling means is arranged at the end on the nozzle device with respect to a longitudinal direction of the nozzle device. Advantageously, this longitudinal direction of the nozzle device is also a main direction of flow of the fluid emerging from the nozzle element. Advantageously, this longitudinal direction also is an axis of symmetry with respect to which the nozzle device is formed to be rotationally symmetrical.

In a further advantageous embodiment, the second coupling means is also arranged at the end on the nozzle device with respect to the longitudinal direction. "At the end" here is understood to mean that this coupling means does not necessarily directly represent the end of the nozzle device, but that it is only a short distance away from this end. Thus for example the first and/or the second coupling means is arranged—relative to the longitudinal direction of the nozzle device—in an end quarter, preferably an end fifth, preferably an end sixth, of the respective nozzle device.

In a further advantageous embodiment, the second coupling means has at least one projection extending in a radial direction of the nozzle device. Advantageously, the second coupling means also has a second correspondingly formed projection. Advantageously, this second projection is arranged located opposite the first projection with respect to the nozzle device. In this case, preferably this projection can engage in a groove which represents an element of the first coupling means. In a further advantageous embodiment, the said groove extends in a peripheral direction of the nozzle device. Advantageously, this groove extends at least in portions obliquely with respect to a peripheral direction or with respect to a plane which is perpendicular to the longitudinal direction.

In a further advantageous embodiment, the coupling device has at least one recess and preferably two recesses which make(s) possible insertion of at least one projection and preferably of at least two projections (of another nozzle device) in the longitudinal direction.

In a further advantageous embodiment, a first coupling means of a first nozzle device and a second coupling means of a second nozzle device jointly form a bayonet-like connection. However, other connections would also be conceivable, such as for example screw connections or snap connections. Bayonet-like connections have however proved particularly beneficial for the present application. On one hand, they permit relatively rapid and also sealing fastening of the nozzle devices to a line. On the other hand, such a bayonet-like connection also permits very rapid removal or attachment of the nozzle devices from/to a line or from/to another nozzle device. In use, the user may take for example an arrangement consisting of five or six nozzle devices and in each case then screw and/or place and/or push the individual nozzle devices onto the different lines of a machine.

In a further advantageous embodiment, the nozzle device has an annular sealing element. Advantageously, this sealing element is arranged in the interior of the support, and lies more preferably against a portion of the nozzle element. Advantageously, this annular sealing element is arranged in the above-mentioned receiving portion, into which can also be inserted for example the above mentioned supply line, or alternatively, in the event of a plurality of nozzle devices being assembled, a further nozzle device.

Advantageously, the annular sealing element is an O-ring-like element. In particular, the sealing element is an resilient sealing element which is resilient in particular in the above-mentioned longitudinal direction of the nozzle device.

In a further advantageous embodiment, the sealing element in an assembled state of two nozzle devices can be clamped between these two nozzle devices. In this manner, it is possible to prevent the sealing element from getting lost if two nozzle devices are plugged together. Furthermore, this sealing element owing to its resilience can also improve the holding-together of the two sealing devices. As mentioned above, this resilience is provided in particular in the longitudinal direction of the sealing element.

In a further advantageous embodiment, at least one radially protruding projection is arranged on the support, which projection permits manual turning of the support. Advantageously, two such radially protruding projections are arranged on the support. More preferably, these projections are wing-like, in order thus to permit a nozzle device to be turned more easily, even manually. Advantageously, these two projections are rotated through a specified angle with respect to the above-mentioned longitudinal direction of the nozzle device, for example through 90°, relative to the first-named projections, which serve as coupling means.

BRIEF DESCRIPTION OF THE DRAWINGS

Further advantages and embodiments will become apparent from the accompanying drawings,
in which.

DETAILED DESCRIPTION OF THE INVENTION

Figure 1:
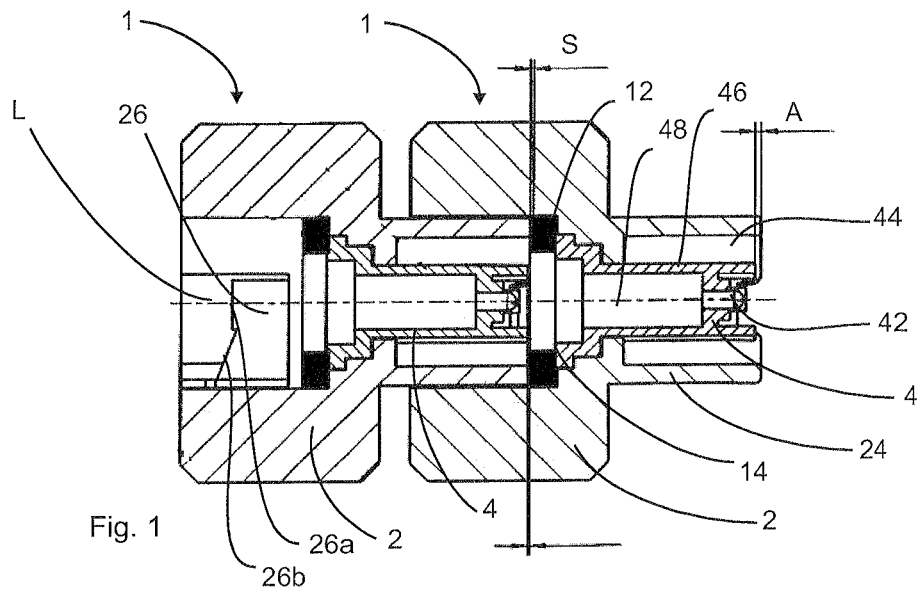
FIG. 1 is a view of two nozzle devices inserted into one another.

FIG. 1 is a view of two nozzle devices 1 according to the invention which are inserted into one another. These two illustrated nozzle devices 1 have in each case a support 2 and also a nozzle element 4 which is received in this support. In this case, it can be seen that this nozzle element 4 is surrounded completely by a receiving projection 24 of the support 2. The nozzle element 4 in turn is formed in two parts and has an outlet 42. Reference sign 46 identifies a basic member of the nozzle element 4.

Reference sign 44 identifies a recess, in particular an encircling recess, which in an inserted state surrounds the nozzle element. Reference sign A identifies a distance by which the nozzle element 4 is set back with respect to the support 2 or relative to the receiving recess or the receiving projection 24.

Reference sign 12 identifies a sealing element which in the use state can be pressed against a line which discharges the flowable medium, in order thus to achieve a sealing effect. Reference sign 14 identifies an annular seat or an annular contact surface against which the sealing element 12 can be placed. In the installed position, the sealing element 12 can be clamped between this seat 14 and for example a mouth edge of a line.

In the assembled state shown in FIG. 1, this sealing element is in turn clamped by an edge of the receiving recess 24 of the second nozzle device 1 (here the nozzle device 1 on the left-hand side), and can thus not get lost. Owing to the fact that the nozzle element itself is set back relative to the receiving recess 24 and in the region, the nozzle element or the end thereof (or the outlet 42) will not contact the further element, i.e. the basic member 46, and/or a region of the second nozzle device 1.

Reference sign 26 identifies a recess which is a constituent of the first coupling means of the nozzle device 1. This recess has a straight-running edge portion 26a and an obliquely-running edge portion 26b. In this context, the terms "straight" and "oblique" are in each case defined relative to a circular line which serves perpendicular to the longitudinal direction of the nozzle device 1. The obliquely-running portion 26b, upon relative rotation of two nozzle devices 1 with respect to each other, serves to urge the two nozzle devices onto each other and thus to fasten them to each other.

Reference sign S identifies a distance which indicates the extent to which the sealing element is squeezed or clamped when assembling two nozzle devices. Reference sign 48 identifies a piston element or a nozzle mouthpiece which is arranged in the nozzle element. In this case, preferably this piston element 48 is movable in the longitudinal direction L relative to the basic member 46 of the nozzle element. In addition, the basic member 46 forms a recess, in particular a cylindrical recess, which is suitable and intended for receiving a portion of this piston element 48.

Figure 2:
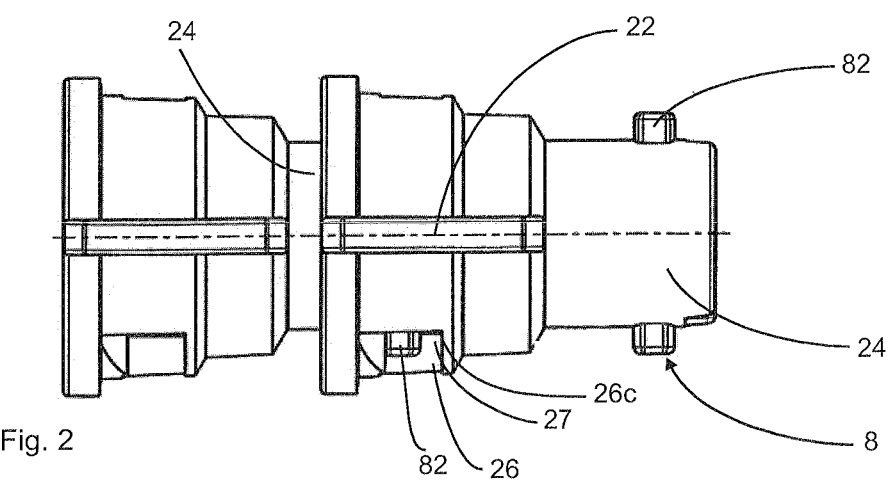
FIG. 2 is an external view of two nozzle devices inserted into one another.

FIG. 2 is an external view of two nozzle devices 1 inserted into one another. It can be seen that the second coupling means is provided on the receiving recess 24 (more precisely, on the outer periphery thereof or the wall of the receiving recess), said means being formed here too by two projections 82 which extend in a radial direction or in a direction perpendicular to the longitudinal direction L.

Reference sign 22 identifies a wing or a projection which makes possible manual turning of a nozzle device with respect to the longitudinal direction L. Furthermore, here too a further projection 82 which is a constituent of the second coupling means 8 can be seen, this projection 82 engaging in a recess 26 in the nozzle device illustrated on the right.

It can be seen, however, that a clearance or a gap extending in the longitudinal direction L is formed between the projection 82 and the edge 26c of the recess. This gap ensures that two nozzle devices can be turned comfortably with respect to each other (and with respect to the longitudinal direction L) for joining.

Figure 3:
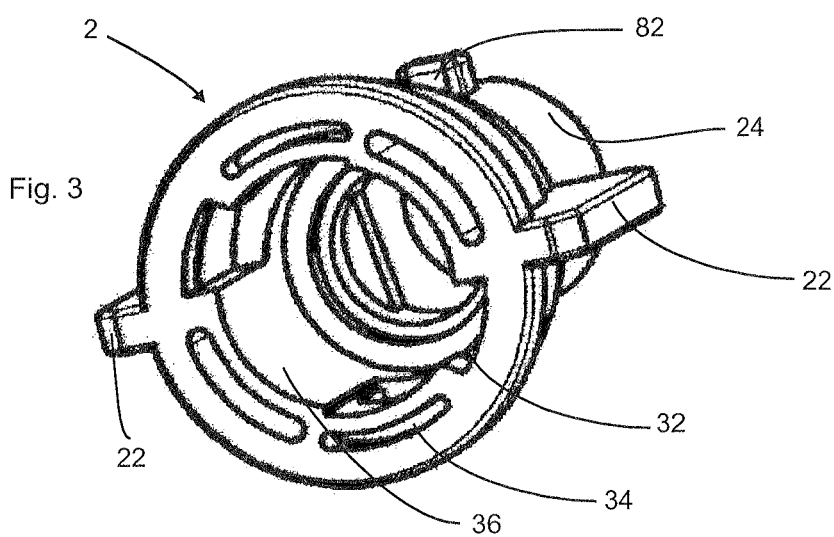
FIG. 3 shows a support of a nozzle device.

FIG. 3 is a perspective view of a support 2. In this case, again the projections 82 which are arranged on the receiving recess 24 (more precisely, on the wall of the receiving recess 24) can be seen. Furthermore, the recess 32, which when putting together two nozzle devices serves to receive the receiving recess 24, can also be seen. Reference sign 32 relates to recesses which serve for receiving the projections 82. In addition, recesses 34 which serve to reduce weight and also to increase stability are also provided. Here again too, the two wings which serve for grasping or for manual turning of the nozzle arrangement can be seen. A nozzle device can also be fastened easily and in particular manually to another nozzle device by means of these wings 22 (by rotation with respect to the longitudinal axis).

Figure 4:
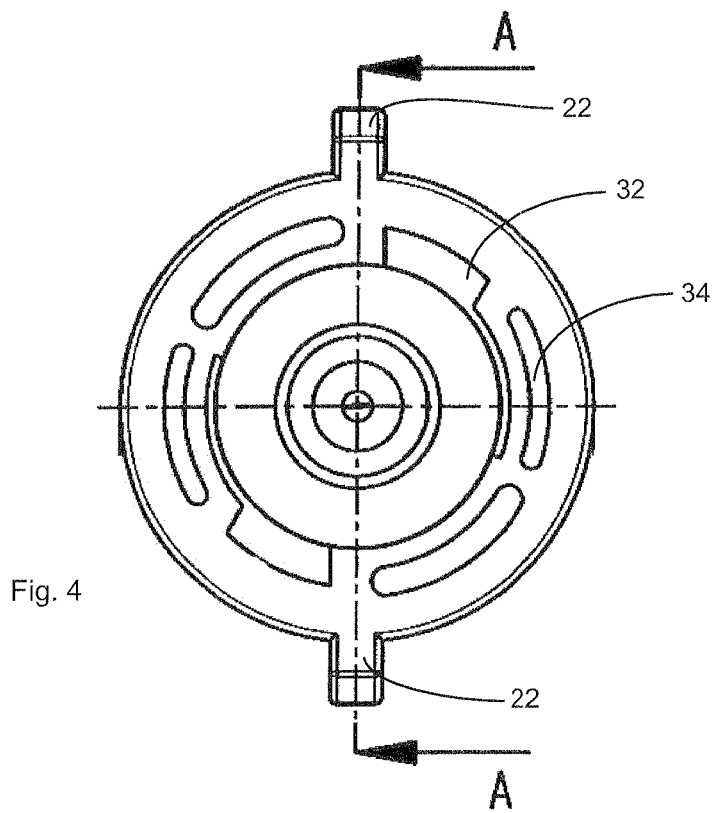
FIG. 4 is a view of the nozzle device along its longitudinal direction.

FIG. 4 is a plan view along the longitudinal direction L (which here runs perpendicular to the plane of the drawing) of a nozzle device 1 according to the invention. Again, the projections or wings 22 which serve to turn the nozzle device 1 can be seen. In addition, the recesses 32 and 34 can also be seen.

Figure 5:
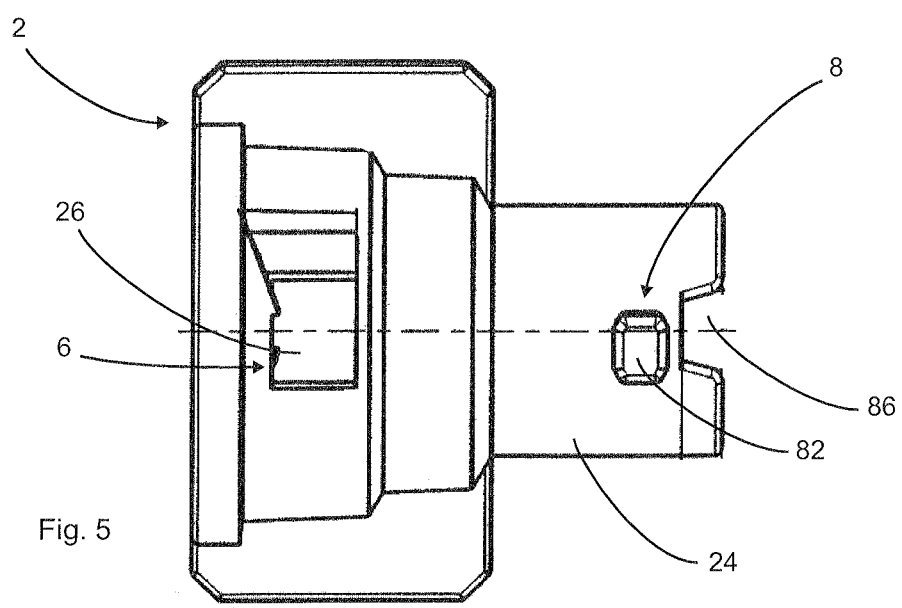
FIG. 5 is a further external view of a support of a nozzle device according to the invention.

Finally, FIG. 5 is a further side view of a device according to the invention. In this view, in particular the two coupling means 6 and 8, which jointly form a bayonet-like closure, can also be seen. The coupling means 8, as mentioned above, is formed by the two projections 82, and the coupling means 6 by the recess 26 which has the oblique portion 26b, which serves for bayonet-like connection of the two nozzle devices.

The applicant reserves the right to claim all the features disclosed in the application documents as essential to the invention, insofar as they are novel individually or in combination over the prior art. It is furthermore pointed out that features which taken by themselves might be advantageous have also been described in the individual drawings. A person skilled in the art will recognise immediately that a certain feature described in one drawing may be advantageous even without adopting further features from this drawing. Further, a person skilled in the art will recognise that advantages may also result from a combination of a plurality of features shown in individual or in different drawings.

LIST OF REFERENCE SIGNS

1 nozzle device
2 support
4 nozzle element, recess
6, 8 coupling means
12 sealing element, projections
22 wing, projection
24 receiving projection, receiving recess
26 recess
26a rectilinear portion
26b inclined portion
32 recesses
34 recesses
36 recess
42 outlet, nozzle element
44 (encircling) recess
46 basic member of the nozzle element 4
48 piston element
82 projection
A distance
L longitudinal direction
S distance

The invention claimed is:

1. A nozzle device for dispensing flowable substances, having a support and a nozzle element arranged at least in part within this support, which element is suitable and intended for dispensing the flowable substance, and having a first coupler, in order to arrange the nozzle device detachably to a supply for the flowable substance, wherein the nozzle device has a second coupler in order to fasten the nozzle device detachably to a further nozzle device, and
  wherein the nozzle element is set back with respect to the support.

2. The nozzle device according to claim 1,
  wherein
  at least one coupler is arranged on the support.

3. The nozzle device according to claim 1,
wherein
the second coupler cooperates mechanically with the first coupler in order to fasten two nozzle devices detachably to each other.

4. The nozzle device according to claim 1,
wherein
at least one coupler is arranged adjacent an end on the nozzle device with respect to a longitudinal direction of the nozzle device.

5. The nozzle device according to claim 4,
wherein
the second coupler is likewise arranged at the end on the nozzle device with respect to the longitudinal direction.

6. The nozzle device according to claim 1,
wherein
the second coupler has at least one projection extending in a radial direction of the nozzle device.

7. The nozzle device according to claim 1,
wherein
the first coupler and the second coupler jointly form a bayonet-like connection.

8. The nozzle-device according to claim 1,
wherein
the nozzle device has an annular sealing element.

9. The nozzle device according to claim 8,
wherein
the sealing element in an assembled state of two nozzle devices can be clamped between the two nozzle devices.

10. The nozzle device according to claim 8,
wherein
at least one radially protruding projection is arranged on the support, which projection permits manual turning of the support.

11. The nozzle device according to claim 4,
wherein
the coupler is arranged adjacent a short distance away from the end of the nozzle device, so that the first and/or second coupler is arranged relative to a longitudinal direction of the nozzle device in an end quarter of the nozzle device.

12. The nozzle device according to claim 4,
wherein
the coupler is arranged adjacent a short distance away from the end of the nozzle device, so that the first and/or second coupler is arranged relative to a longitudinal direction of the nozzle device in an end fifth of the nozzle device.

13. The nozzle device according to claim 4,
wherein
the coupler is arranged adjacent a short distance away from the end of the nozzle device, so that the first and/or second coupler is arranged relative to a longitudinal direction of the nozzle device in an end sixth of the nozzle device.

14. The nozzle device according to claim 1,
wherein
the first coupler has a groove which extends at least in portions obliquely with respect to a peripheral direction or with respect to a plane which is perpendicular to a longitudinal direction of the nozzle device.

15. The nozzle device according to claim 1,
wherein
the support has recesses which serve to reduce weight and also to increase stability.

16. The nozzle device according to claim 1,
wherein
the nozzle element or an end (or outlet) is free of contact with a further element.

17. The nozzle device according to claim 1, wherein the nozzle element is formed in at least two parts.

18. The nozzle device according to claim 1,
wherein
the nozzle element has a dispensing element adapted to dispense the flowable substance, and a further element separable from the dispensing element.

* * * * *